United States Patent
Zhang et al.

(10) Patent No.: US 9,705,274 B2
(45) Date of Patent: Jul. 11, 2017

(54) ELECTRICAL CONNECTOR AND METHOD OF MAKING THE SAME

(71) Applicant: FOXCONN INTERCONNECT TECHNOLOGY LIMITED, Grand Cayman (KY)

(72) Inventors: Jie-Feng Zhang, Shenzhen (CN); Fu-Jin Peng, Shenzhen (CN)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 15/011,684

(22) Filed: Feb. 1, 2016

(65) Prior Publication Data
US 2016/0240981 A1 Aug. 18, 2016

(30) Foreign Application Priority Data
Feb. 13, 2015 (CN) .......................... 2015 1 0076920

(51) Int. Cl.
*H01R 43/20* (2006.01)
*G06K 13/00* (2006.01)
*H01R 13/6591* (2011.01)

(52) U.S. Cl.
CPC ............. *H01R 43/20* (2013.01); *G06K 13/00* (2013.01); *H01R 13/6591* (2013.01)

(58) Field of Classification Search
USPC ...... 439/607.22, 153, 159, 357, 607.34, 680
See application file for complete search history.

(56) References Cited

U.S. PATENT DOCUMENTS

| 5,073,130 A * | 12/1991 | Nakamura | ....... H01R 13/65802 439/607.32 |
| 6,478,630 B1 * | 11/2002 | Hsu | ....................... G06K 13/08 439/607.31 |
| 6,955,548 B1 * | 10/2005 | Wang | ..................... G06K 13/08 439/159 |

(Continued)

FOREIGN PATENT DOCUMENTS

| CN | 201797084 U | 4/2011 |
| JP | 4757324 | 10/2011 |

(Continued)

*Primary Examiner* — Alexander Gilman
(74) *Attorney, Agent, or Firm* — Wei Te Chung; Ming Chieh Chang

(57) ABSTRACT

An electrical connector (100) includes an insulative housing (1), a number of conductive contacts (5) retained in the insulative housing, a metal shell (4) embedded in the insulative housing and a metal cover (3) assembled to the insulative housing. The insulative housing includes a base (10) and a slot (6) formed above the base, and the conductive contacts embedded into the base and defining contact portions (51) protruding into the slot and soldering portions (52) opposite to the contact portions. The metal shell includes a main portion (41) embedded into the base, and a longitudinal side portion (40) bending from at least one side of the main portion and extending in the front-to-back direction. The side portion locates at one side of the slot and electrically connects with the metal cover. Above all, the manufacturing process of the electrical connector is simplified, and the shielding effect is enhanced.

16 Claims, 5 Drawing Sheets

(56) References Cited

U.S. PATENT DOCUMENTS

| | | | | |
|---|---|---|---|---|
| 7,758,379 B2* | 7/2010 | Chen | H01R 13/6485 | 439/607.11 |
| 8,414,316 B2* | 4/2013 | Zhang | G06K 7/003 | 439/159 |
| 9,142,918 B2* | 9/2015 | Zhang | G06K 13/0812 | |
| 9,209,542 B1* | 12/2015 | Shih | H01R 12/72 | |
| 9,276,365 B2* | 3/2016 | Yu | H01R 24/70 | |
| 9,281,629 B2* | 3/2016 | Little | H01R 13/6583 | |
| 9,306,336 B2* | 4/2016 | Chang | H01R 13/6471 | |
| 9,379,494 B1* | 6/2016 | Hu | H01R 13/6594 | |
| 9,385,484 B2* | 7/2016 | Chen | H01R 13/6582 | |
| 9,461,412 B2* | 10/2016 | Yu | H01R 13/6585 | |
| 9,461,413 B2* | 10/2016 | Duan | H01R 13/6594 | |
| 9,461,415 B2* | 10/2016 | Guo | H01R 13/41 | |
| 9,466,930 B2* | 10/2016 | Little | H01R 24/60 | |
| 9,472,911 B2* | 10/2016 | Little | H01R 24/60 | |
| 2007/0161274 A1* | 7/2007 | Tanaka | G06K 7/0021 | 439/159 |
| 2009/0163071 A1* | 6/2009 | Chen | H01R 13/65802 | 439/352 |
| 2010/0267261 A1* | 10/2010 | Lin | H01R 13/6461 | 439/218 |
| 2010/0267267 A1* | 10/2010 | Zhou | H01R 13/62 | 439/328 |
| 2011/0189875 A1* | 8/2011 | Yu | H01R 13/62 | 439/159 |
| 2011/0250772 A1 | 10/2011 | Zhang | | |
| 2012/0094514 A1* | 4/2012 | Sun | H01R 13/62 | 439/159 |
| 2012/0164882 A1* | 6/2012 | Ozeki | H01R 12/772 | 439/607.46 |
| 2012/0276764 A1* | 11/2012 | Nakase | G06K 13/0831 | 439/159 |
| 2014/0065871 A1* | 3/2014 | Ye | G06K 13/085 | 439/357 |
| 2014/0315432 A1* | 10/2014 | Soo | H01R 12/72 | 439/620.01 |
| 2015/0171573 A1* | 6/2015 | Little | H01R 24/60 | 439/607.34 |
| 2015/0200506 A1* | 7/2015 | Guo | H01R 24/60 | 439/607.58 |
| 2015/0249306 A1 | 9/2015 | Han et al. | | |
| 2015/0263452 A1* | 9/2015 | Zhang | G06K 13/0831 | 439/153 |
| 2015/0333444 A1* | 11/2015 | Wang | H01R 13/633 | 439/159 |
| 2016/0240981 A1* | 8/2016 | Zhang | H01R 43/20 | |

FOREIGN PATENT DOCUMENTS

| | | |
|---|---|---|
| TW | M379243 | 4/2010 |
| TW | M414725 | 10/2010 |
| TW | 496595 | 7/2012 |
| TW | M485524 | 9/2014 |

* cited by examiner

ELECTRICAL CONNECTOR AND METHOD OF MAKING THE SAME

BACKGROUND OF THE INVENTION

1. Field of the Invention

The present invention relates to an electrical connector and method of making the same, particularly to the electrical connector for insertion of an electronic memory card.

2. Description of Related Art

Please refer to the Chinese utility patent No. CN201797084U which discloses an electrical connector mounted on a printed circuit board. The electrical connector comprises an insulative housing, a terminal module and a metal cover assembled to the insulative housing. The insulative housing comprises a base and a side portion extending and formed from the base. The metal cover comprises a body portion and a welding sheet downwardly bending and extending from two sides of the body portion, and the welding sheet has openings to match with the tuber formed on the side portion of the insulative housing to fix the metal cover. But the side portions of the electrical connector is plastic structure, it requires metal pieces separately buried to enhance the signal shielding effect and the intensity of the side portions, not only the shielding effect is poor, but also the manufacturing process is cumbersome.

Hence, an electrical connector including an improved structure is necessary.

SUMMARY OF THE INVENTION

Accordingly, an object of the present invention is to provide an electrical connector and method of making the same with improved structure.

To achieve the above object, an electrical connector includes an insulative housing, a number of conductive contacts retained in the insulative housing, a metal shell embedded in the insulative housing and a metal cover assembled to the insulative housing. The insulative housing includes a base and a slot formed above the base, and the conductive contacts embedded into the base and defining contact portions protruding into the slot and soldering portions opposite to the contact portions. The metal shell includes a main portion embedded into the base, and a longitudinal side portion bending from at least one side of the main portion and extending in the front-to-back direction. The side portion locates at one side of the slot and electrically connects with the metal cover.

Other objects, advantages and novel features of the invention will become more apparent from the following detailed description when taken in conjunction with the accompanying drawings.

DETAILED DESCRIPTION OF THE PREFERRED EMBODIMENT

Reference will now be made in detail to the preferred embodiment of the present invention.

Figure 1:
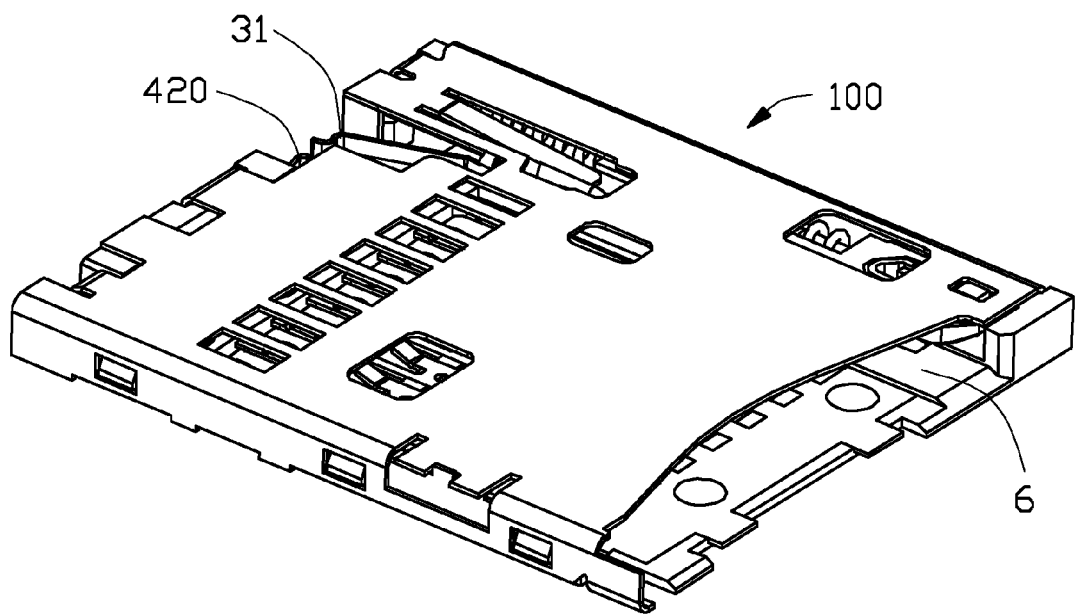
FIG. 1 is a perspective, fully view of the electrical connector according to one embodiment of the invention.
Figure 2:
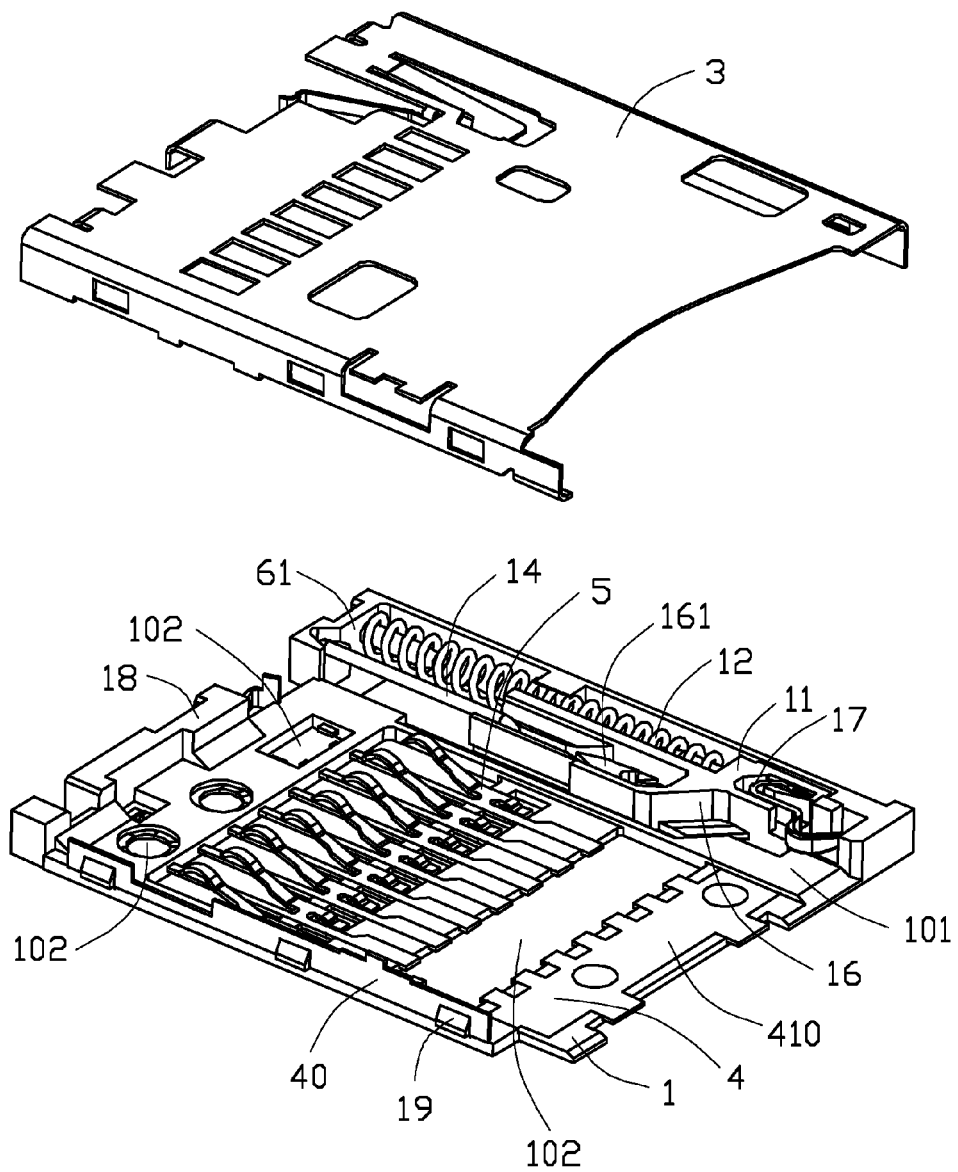
FIG. 2 is a perspective, partly exploded view of the electrical connector show in FIG. 1.

Referring to FIGS. 1-2, an electrical connector 100, used for assembling an electrical card (not shown) therein, comprises an insulative housing 1, a plurality of conductive contacts 5 retained in the insulative housing 1, a metal shell 4 embedded in the insulative housing 1 and a metal cover 3 assembled to the insulative housing 1. The metal cover 3 is formed and stamped from a metal sheet, which engaged in the insulative housing 1 and enclosed a slot or card receiving cavity 6 with the insulative housing 1. The electrical card is inserted into the opening of the slot 6.

Figure 3:
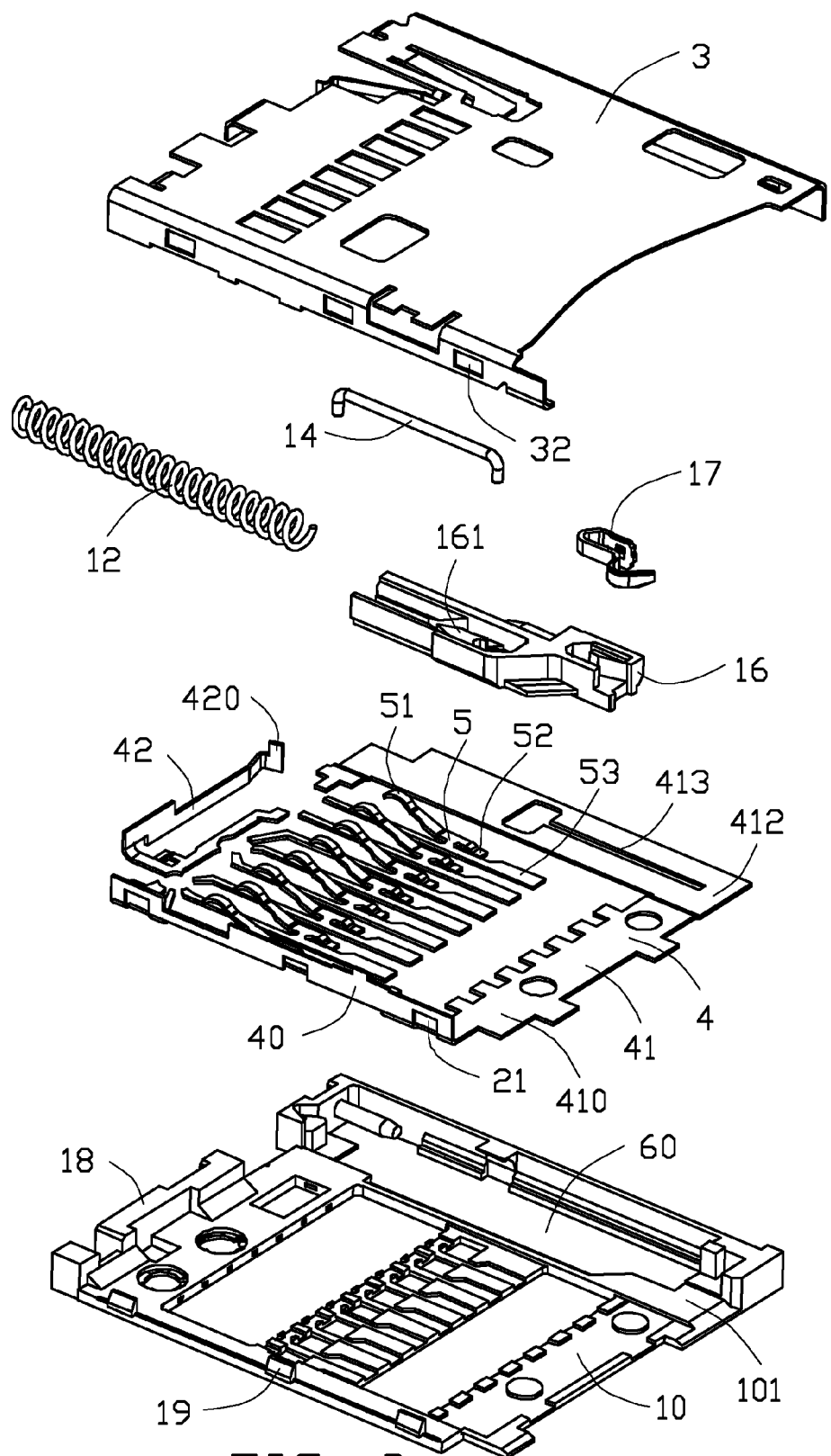
FIG. 3 is a perspective, fully exploded view of the electrical connector show in FIG. 1.

Referring to FIG. 3, the insulative housing 1 defines a base 10, and said slot 6 is above the base 10. The metal shell 4 includes a main portion 41 embedded into the base 10, and a longitudinal side portion 40 bending from at least one side of the main portion 41 and extending in the front-to-back direction. The side portion 41 locates at one side of the slot 6.

Figure 5:
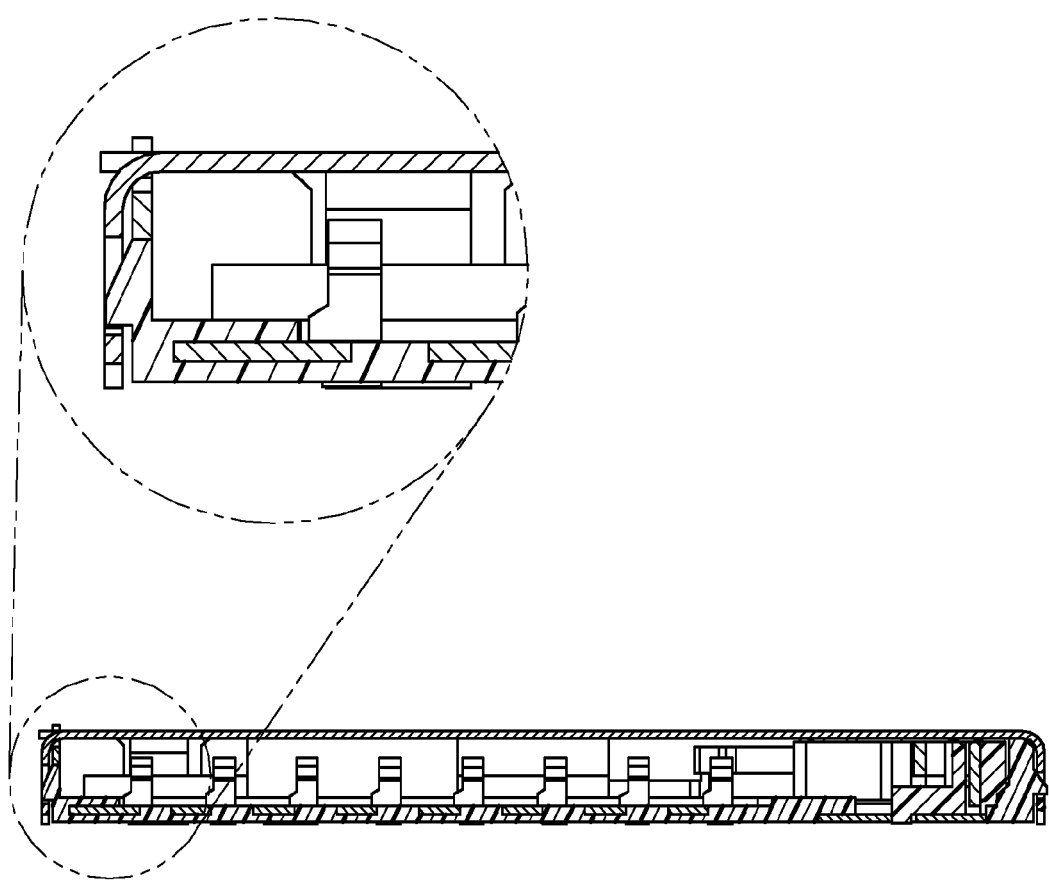
FIG. 5 is a cross-sectional view of the electrical connector of FIG. 1.

The side portion 40 is partially embedded in the insulative housing 1 to stabilize said side portion 40 that is vertically set in the insulative housing 1 from the side of the insulative housing 1. The side portion 40 forms many indentations 21 at its junction with the base 10. The base 10 of the insulative housing 1 defines a set of tubers 19 extending upwardly and embedded molding with said side portion 40, and the tubers 19 are formed not only in the indentations 21 but also laterally protruding outwardly beyond the indentation 21 (as shown in FIG. 5). Correspondingly, the metal cover 3 has a side wall defining a set of engaging sections 32 engaging with the tubers 19. When the metal shell 3 is assembled to the insulative housing 1, the tuber 19 fully passes though the engaging sections 32 whose edge of bottom lock the lower surface of said tuber 19 to lock metal cover 3, as the metal cover 3 fits with the side portion 40 at the same time. One feature of the invention is to have the interior surface of the side portion 40 coplanar with the interior surface of the tuber 19 (as shown in FIG. 5).

The main portion 41 has an upper surface 410 facing the slot 6, the upper surface 410 is not higher than the upper surface 101 of the base 10 of the insulative housing 1.

The conductive contacts 5 embedded and formed into the base 10, comprise contact portions 51 upwardly protruding into the slot 6 and soldering portions 52 downwardly bending and extending to fit with the circuit board (not shown) thereby forming a conductive loop between the circuit board (not shown) and the electrical card (not shown) inserted in the slot 6. The conductive contacts 5 also have a retaining portion 53 which are parallel to the contacting portions 51 and the soldering portions 52. The retaining portion 53 presenting elongated shape and extending along the fore-and-aft direction, and the base 10 of the insulative housing 1 defines openings 102 at two ends of the longitudinal direction of the retaining portion 53.

Figure 4:
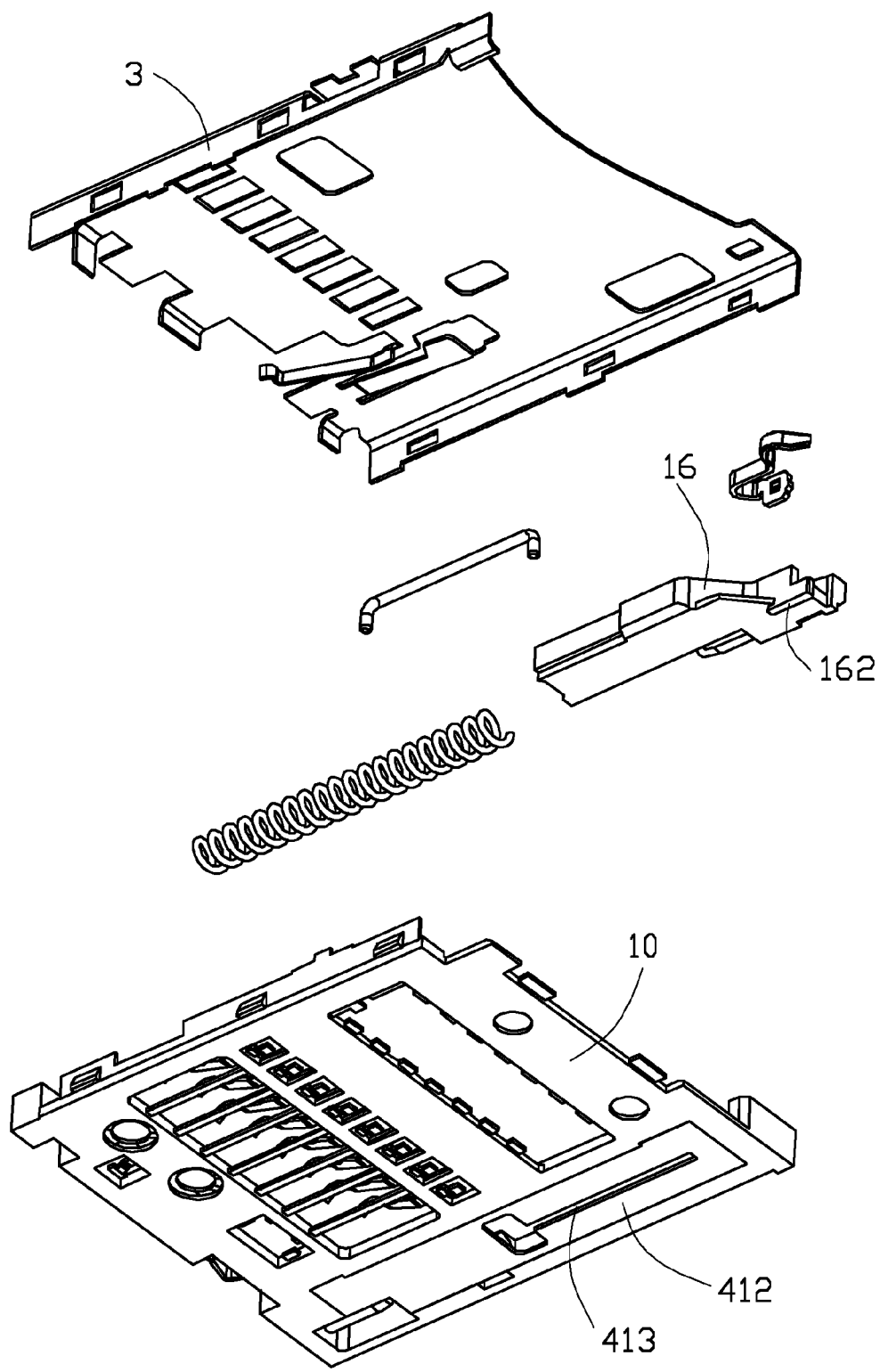
FIG. 4 is another perspective, partly view of the electrical connector shown in FIG. 1.

Referring to FIG. 4, the base 10 has a guiding groove 60 passing through in a height direction thereof and locating at one side of the slot 6, the main portion 41 has a metal plate 412 bending downwardly from the other side of the main portion 41 and extending in the front-to-back direction, the metal plate 412 locates in the guiding groove 60 and defines a hollow rail 413 at the front-to-back direction.

The insulative housing 1 defines a stopping wall 18 related to the openings 102 of the slot 6, said stopping wall 18 embedded a reinforcing sheet 42 which includes a mating portion 420 extending out of the stopping wall 18. When said metal cover 3 assembled on the insulative housing 1, referring to FIG. 1, the mating portion 420 generates electrical connection with the shell fragment 31 of the metal cover 3. Because of the electrical connection between the metal shell 4 and the metal cover 3 what the reinforcing sheet 42 and metal shell 4 and metal cover 3 surrounding the conductive contacts 5, so as to make better signal shielding effect of the electrical connector 100; at the same time, the physical strength of the electrical connector 100 was reinforced for the reason of the main portion 41 retained in the base 10.

In the present embodiment, it uses the following technical means for producing the electrical connector 100:

(i). integrally forming and stamping a metal shell 4 and a plurality of conductive contacts 5 from one piece of metal sheet, the metal shell 4 including a main portion 41 and a longitudinal side portion 40 bending from one side of the main portion 41 and extending in the front-to-back direction, the side portion 40 forwardly forming many indentations 21 from bottom to up. Each of the conductive contacts 5 define a retaining portion 53 jointing the main portion 41 of the metal shell 4.

(ii). injection molding with plastic onto the main portion 41 and the conductive contacts 5 to form an insulative housing 1, the insulative housing 1 including a base 10 molded over the main portion 41 and the conductive contacts 5 and a slot 6 formed above the base 10, the main portion 41 having an upper surface 410 facing the slot 6 is not higher than the upper surface 101 of the base 10 of the insulative housing 1. Said side portion 40 locates at one side of the slot 6. The insulative housing 1 forms openings 102 at the joint between the retaining portion 53 and the main portion 41, meanwhile, the insulative housing 1 defining a tuber 19 extending upwardly from the base 10, the tuber 19 not only filled within the corresponding indentation 21 but also laterally protruding outwardly beyond the indentation 21. Optimally, an exterior surface of the side portion is coplanar with an exterior surface of the lateral side edge of the base (as shown in FIG. 5). Also, some upward protrusions (not labeled) of the base 10 is essentially horizontally coplanar with the main portion 41 (as shown in FIG. 5).

(iii). trimming the retaining portion 33 out of the main portion 10 at the joint exposed on the opening to separate the conductive contacts 5 and the metal shell 4 from connection, meanwhile, the metal shell 4 separated a reinforcing sheet 42 embedded in the insulative housing 1 and related to the of the stopping wall 18 of opening of the slot 6 to enhance the strength of the stopping wall 18.

(iv). providing a metal cover 3 and assembling the metal cover 3 to the insulating housing 1. The electrical connection between the metal shell 4 and the reinforcing sheet 42 makes a better signal shielding effect of the electrical connector 100.

Referring to FIGS. 2-4, furthermore, the electrical connector 100 comprises an ejector 11 assembled at one end of the insulative housing 1, the ejector 11 comprising a spring member 12 retained in the guiding groove, a pin member 14 and a slider 16, and comprising with corresponding part between the insulative housing 1 and the metal cover 3. The slider 16 further includes a top extending from one side to the slot 6 and a heart-shaped rail 161 in the other side; one end of the pin member 14 installed on the insulative housing 1, the other end matches with the heart-shaped rail 161; One end of the spring member 12 retained to the block wall 61 of the insulative housing 1 and the other end urging the slider 16 to move along the ejection direction opposite to the mating direction. The bottom of the slider 16 defines a protrusion 162, the protrusion 162 cooperating with the guide rail 413 of the metal plate 412 to limit the slide 16 slide along the longitudinal direction. Otherwise, the slide 16 defines an elastic member 17 at the other end of spring member 12, one end of the elastic member 17 fixed on the slider 16, the other end projection extending into the slot 6 to form a pressing portion. When the elastic member 17 follows the movement of the slider 16, the pressing portion is stopped by the block of the guiding groove 60 and moves at a vertical direction of the slide 16.

When the mating electronic card is not inserted in the slot 6, the slider 16 is in the first position close to the opening of slot 6 under the effect of the spring member 12, meanwhile, the pressing portion of the elastic member 17 is in a free state. When the mating electronic card inserted in the slot 6, pressing the top of the slider 16 to push the slider 16 and finally reach the second position, at this time, one end of the pin member 14 entering into the engaging position of the heart-shaped rail 161, thereby limiting said slider 16 while aforementioned pressing portion moved along the vertical direction of the mating direction to the internal of the slot 6 and fixed the electronic card for fear that said electronic card separated accidentally from the slot 6. When pushing the mating electronic card and releasing again, the pin member 14 slides along the engaging positions, and the slider 16 returns to the first position under the effect of the spring member 12, the top of the slider 16 pushing the electronic card out of slot 6, the pressing portion of the elastic member 17 is not pressing the mating electronic card but in a free state which the mating electronic card can be easily took out.

Compared with the traditional electric connector, on the one hand, this electrical connector 100 uses side portion 40 and makes the metal shell 4 surrounding the conductive contacts 5 and metal cover 3 achieve a electrical connection to obtain the better shielding effect; on the other hand, the side portion 40 equipped with indentations 21 and tubers in the indentations 21 extending from the insulative housing 1, when strengthening the engaging force of the insulative housing 1 and the side portion 40, also providing buffer during the assembling process of manufacturing of the side portion 40 and the metal cover 3. In addition, the metal shell 4, the conductive contacts 5 and the reinforcing sheet 42 are made into a whole, which further simplifies the manufacturing process.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. An electrical connector comprising:
an insulative housing including a base and a slot formed above the base;
a plurality of conductive contacts embedded into the base and defining contact portions protruding into the slot and soldering portions opposite to the contact portions;
a metal shell embedded in the insulative housing; and
a metal cover assembled to the insulative housing and shielding said slot;
wherein said conductive contacts and metal shell are integrally formed from one piece of metal sheet before trimming off, the metal shell includes a main portion embedded into the base, and a longitudinal side portion bending from at least one side of the main portion and extending in the front-to-back direction, the side portion locates at one side of the slot and electrically connects with the metal cover, the base has a guiding groove passing through in a height direction thereof and locating at one side of the slot, the main portion has a metal plate bending downwardly from the other side of the main portion and extending in the front-to-back direction, the metal plate locates in the guiding groove and defines a hollow rail at the front-to-back direction.

2. The electrical connector as claimed in claim 1, wherein the base of the insulative housing defines a set of tubers extending upwardly and embedded molding with said side portion, and the metal cover has a side portion defining a set of engaging sections engaged with the tubers.

3. The electrical connector as claimed in claim 2, wherein the side portion forms a plurality of indentations around a junction with the base, and the tubers are not only filled within but also laterally protruding outwardly beyond the corresponding indentations, respectively.

4. The electrical connector as claimed in claim 3, wherein an interior surface of the side portion and an interior surface of the tuber are coplanar with each other.

5. The electrical connector as claimed in claim 1, wherein the main portion has an upper surface facing the slot, the upper surface is not higher than the upper surface of the base of the insulative housing.

6. The electrical connector as claimed in claim 1, wherein each of the conductive contacts defines a retaining portion embedded into the base, the retaining portion is parallel to the contacting portions and the soldering portions.

7. The electrical connector as claimed in claim 6, wherein each retaining portion presents as an elongated shape and extends in the front-to-back direction, the base of the insulative housing has a pair of openings at the two ends of the retaining portions in the front-to-back direction for trimming the conductive contacts from the metal shell.

8. A making method of the electrical connector comprising steps of:
   (i). integrally forming and stamping a metal shell and a plurality of conductive contacts from one piece of metal sheet, the metal shell including a main portion and a longitudinal side portion bending from one side of the main portion and extending in the front-to-back direction, each of the conductive contacts defining a retaining portion jointing the main portion of the metal shell;
   (ii). injection molding with plastic onto the main portion and the conductive contacts to form an insulative housing, the insulative housing including a base molded over the main portion and the conductive contacts and a slot formed above the base, the side portion locating at one side of the slot, the insulative housing forming openings at a joint between the retaining portion and the main portion;
   (iii). trimming the retaining portion out of the main portion at the joint exposed in the opening to separate the conductive contacts from the metal shell;
   (iv). providing a metal cover and assembling the metal cover to the insulating housing.

9. The making method of the electrical connector as claimed in claim 8, wherein the side portion forms a set of indentations at a junction with the base, the insulative housing forms a set of tubers extending upwardly and embedded molding with said side portion by not only filling fully the corresponding indentations but also laterally protruding outwardly beyond the corresponding indentations, the metal cover has a side portion defining a set of engaging sections engaging with the tubers.

10. The making method of the electrical connector as claimed in claim 9, wherein an interior surface of the side portion is coplanar with an interior surface of the tuber.

11. The making method of the electrical connector as claimed in claim 8, wherein the upper surface of the main portion facing the slot is not higher than the upper surface of the base of the insulative housing.

12. An electrical connector comprising:
   an insulative housing with corresponding conductive contacts and metallic shell embedded therein via an insert-molding process,
   said housing including a base cooperating with a metallic side portion, which is unitarily formed on one lateral side of the shell and extending along the front-to-back direction, to commonly define a card receiving cavity located above the base and communicating with an exterior along a front-to-back direction, said conductive contacts having corresponding resilient contacting sections extending into the card receiving cavity in a vertical direction perpendicular to said front-to-back direction;
   said side portion forming a plurality of indentations;
   said housing forming a plurality of tubers not only fully filled within the corresponding indentations but also laterally protruding outwardly beyond the corresponding indentations in a transverse direction perpendicular to both said front-to-back direction and said vertical direction.

13. The electrical connector as claimed in claim 12, wherein an interior surface of the side portion is coplanar with another interior surface of the tuber.

14. The electrical connector as claimed in claim 12, further including a metallic cover assembled, along the vertical direction, upon the integrally formed housing, contacts and shell, wherein said cover includes a plurality of engaging sections interlocked with the corresponding tubers in the vertical direction, respectively.

15. The electrical connector as claimed in claim 12, wherein an exterior surface of the side portion is coplanar with another exterior surface of a lateral side edge of the base.

16. The electrical connector as claimed in claim 12, wherein said shell includes a horizontal main portion unified with the base, and said base includes a plurality of upward protrusions horizontally coplanar with the main portion.

* * * * *